United States Patent [19]

Namand et al.

[11] Patent Number: 4,569,365

[45] Date of Patent: Feb. 11, 1986

[54] DEVICE FOR DETECTING THE OPERATION OF A VALVE

[75] Inventors: Henri Namand, Aubagne; François Gemigniani, Martigues, both of France

[73] Assignees: Framatome & Cie, Courbevoie; S.A. Sebim, Chateauneuf les Martigues, both of France

[21] Appl. No.: 506,140

[22] Filed: Jun. 20, 1983

[30] Foreign Application Priority Data

Jul. 29, 1982 [FR] France .................... 82 13253

[51] Int. Cl.$^4$ ............................. F16K 37/00
[52] U.S. Cl. ....................... 137/554; 137/797; 92/5 R; 116/277
[58] Field of Search ........... 137/554, 556, 797, 392; 92/5 R, 5 L; 116/212, 277

[56] References Cited

U.S. PATENT DOCUMENTS

| | | | |
|---|---|---|---|
| 3,565,089 | 2/1971 | Thompson | 137/556 |
| 3,837,357 | 9/1974 | Slaughter, Jr. | 137/554 |
| 3,916,946 | 11/1975 | Motzer | 137/554 |
| 4,194,528 | 3/1980 | Kepler | 137/554 |
| 4,207,564 | 6/1980 | Isakson et al. | 92/5 R |

FOREIGN PATENT DOCUMENTS

| | | | |
|---|---|---|---|
| 472102 | 3/1951 | Canada | 137/554 |
| 1450551 | 12/1968 | Fed. Rep. of Germany | 137/554 |
| 2907800 | 9/1980 | Fed. Rep. of Germany | 137/554 |

Primary Examiner—Alan Cohan
Assistant Examiner—John A. Rivell
Attorney, Agent, or Firm—Pollock, Vande Sande & Priddy

[57] ABSTRACT

Device for detecting the operation of a valve, comprising a movable member (15) connected kinematically to a movable part (6) fastened to the closure member of the valve. A detector (24, 25, 26) makes it possible to monitor the displacements or the position of the detection member (15). The detection member (15) has at least one part provided with a predetermined breaking point (20). The kinematic connection between the valve and the detection member (15) can thus be interrupted by the breaking of the member (15) in the event of the jamming of the latter. The invention is in particular applicable to safety valves in nuclear power stations.

3 Claims, 4 Drawing Figures

DEVICE FOR DETECTING THE OPERATION OF A VALVE

FIELD OF THE INVENTION

The invention relates to a device for detecting the operation of a valve, such as a safety valve, and more precisely to a device permitting the monitoring of the correct operation of a safety valve.

BACKGROUND OF THE INVENTION

Safety valves are devices commonly used in installations utilizing various apparatus for the storage and handling of fluids. When a high level of reliability is required of such installations, for example in the case of nuclear power stations, it is indispensable to make certain of the correct operation of all components, particularly the safety valves. It is therefore appropriate to install on these valves devices detecting their operation.

Detection devices of this kind may comprise a detection means which is displaced at the same time as the movable portion of the valve carrying the valve closure means.

It is then possible to detect the displacement of the movable part of the valve, or else the closure or opening of the latter, by monitoring the displacements or the position of the movable detection means.

However, these extremely simple devices, which are also extremely reliable because they follow the displacements of the movable part of the valve, with which they are generally in direct contact, are not entirely satisfactory because they require the fitting to the valve of detection means which are liable to hinder the correct operation of the valve itself and consequently entail a reduction of the reliability of the valve.

SUMMARY OF THE INVENTION

The aim of the invention is therefore to propose a device for the detection of the operation of a valve, comprising a movable detection member connected kinematically to a movable part fastened to the closure member of the valve, the detection member being in direct contact with the said movable part, and a displacement and/or position detector for monitoring the displacements and/or the position of the detection member, this detection device making it possible to avoid any hindrance to the correct operation of the valve.

To this end, the detection member comprises at least one part having a predetermined breaking point making it possible to interrupt the kinematic connection between the valve and the detection member, through the breaking of that part, in the event of the jamming of the detection member.

BRIEF DESCRIPTION OF THE DRAWINGS

In order to enable the invention to be more clearly understood, a description will now be given, by way of example, with reference to the accompanying drawings, of two different embodiments of a device according to the invention, applied to a safety valve.

DETAILED DESCRIPTION

Figure 1:
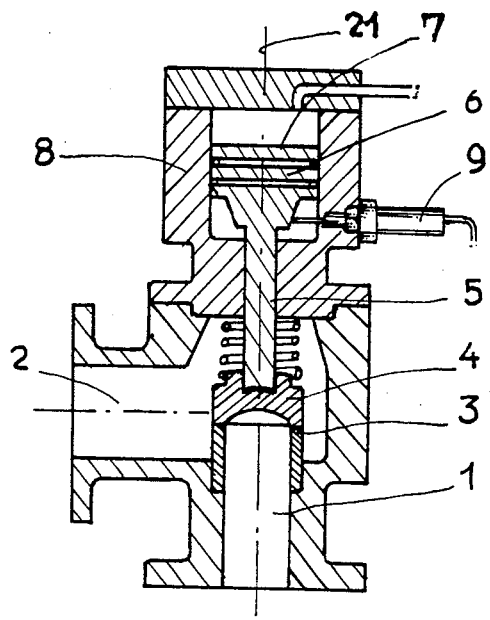
FIG. 1 is a view in section through a vertical plane of an hydraulically controlled valve provided with a detection device corresponding to a first embodiment of the invention.

FIG. 1 shows a safety valve of conventional general design. This valve comprises an inlet aperture 1, an outlet aperture 2, a fixed seat 3, and a closure member 4 which comes to bear against the seat 3 in order to close the valve, and which moves away from the seat 3 in order to open it. The closure member 4 is connected by a rod 5 to a piston 6, whose front face 7 is subjected to the action of a fluid controlling the opening and closing of the valve. The rod 5 and the piston 6 constitute the movable part of the valve.

The detection device 9 according to the invention is mounted on the valve in such a manner as to detect the displacements or the relative position of the movable part with respect to the fixed part or body 8 of the valve. It can in fact be seen that the open or closed state of the valve is directly linked to the relative position of the movable part 5, 6 with respect to the valve body 8.

Figure 2:
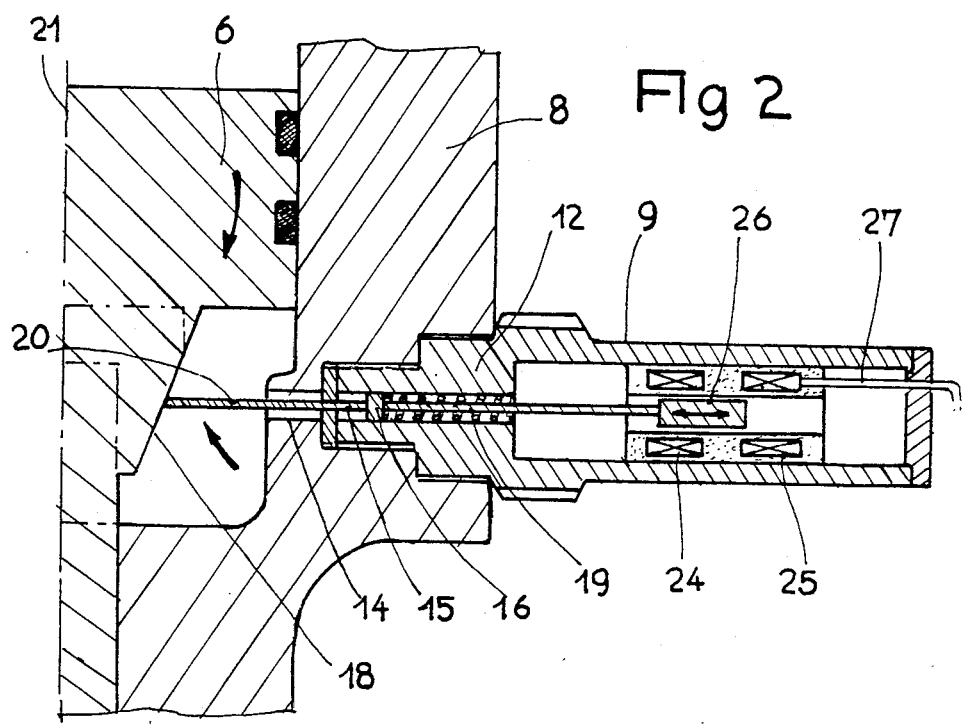
FIG. 2 is a view on a larger scale of the portion of the device shown in FIG. 1 where the detection device according to the invention is disposed.

The detection device 9 can be seen in greater detail in FIG. 2. This detection device comprises a a casing 12 composed of a sleeve fixed on the valve body 8 at the level of an opening 14 passing through the valve body.

A rod 15 is mounted for translation inside the casing 12, and is guided by means of a centering and support member 16 for its translatory movement in the direction of the axis of the opening 14, inside the valve body 8.

The junction portion between the rod 5 and the piston 6 of the movable part of the valve has a frusto-conical outer surface 18, and the front end of the rod 15 is held bearing against this frusto-conical surface 18 by a spring 19 bearing against the sleeve 12 fastened to the valve body 8.

The front part of the rod 15 is provided with a predetermined breaking point 20. The rod 15 is connected kinematically to the movable part of the valve, because the displacements of the valve in the direction of its axis 21 are transmitted by the frusto-conical surface 18 to the rod 15, which is biased against this frusto-conical surface by the spring 19.

The displacements of the rod 15 are controlled with the aid of a displacement transducer consisting essentially of a ferrite member 26 fastened to the end of the rod 15 remote from the end in contact with the surface 18, and of two windings 24 and 25 constituting the primary and secondary windings of a differential transformer type displacement transducer.

A displacement transducer of this kind is of known design and need not be described in detail. The windings 24 and 25 are connected by conductors 27 to an electronic device which at its output transmits signals representing the position or the displacements of the ferrite member 26, and therefore of the rod 15 and of the movable part of the valve.

In the event of the jamming of the detection member consisting of the rod 15, the stresses applied by the movable part of the valve to this rod will cause it to break at the predetermined breaking point 20, so that the kinematic connection between the movable part of the valve and the detection member is interrupted. The valve therefore continues to work normally.

Figure 3:
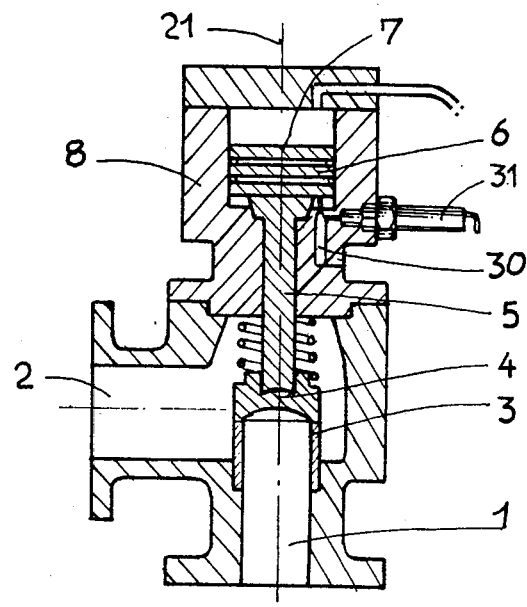
FIG. 3 is an view in section through a vertical plane of a hydraulically controlled valve provided with a device according to a second embodiment the portion of the device shown in the invention.

In FIG. 3, elements corresponding to the elements shown in FIG. 1 are given the same references. It can be seen that the detection device is composed of an assembly comprising a movable finger 30 and a displacement detection arrangement 31.

Figure 4:
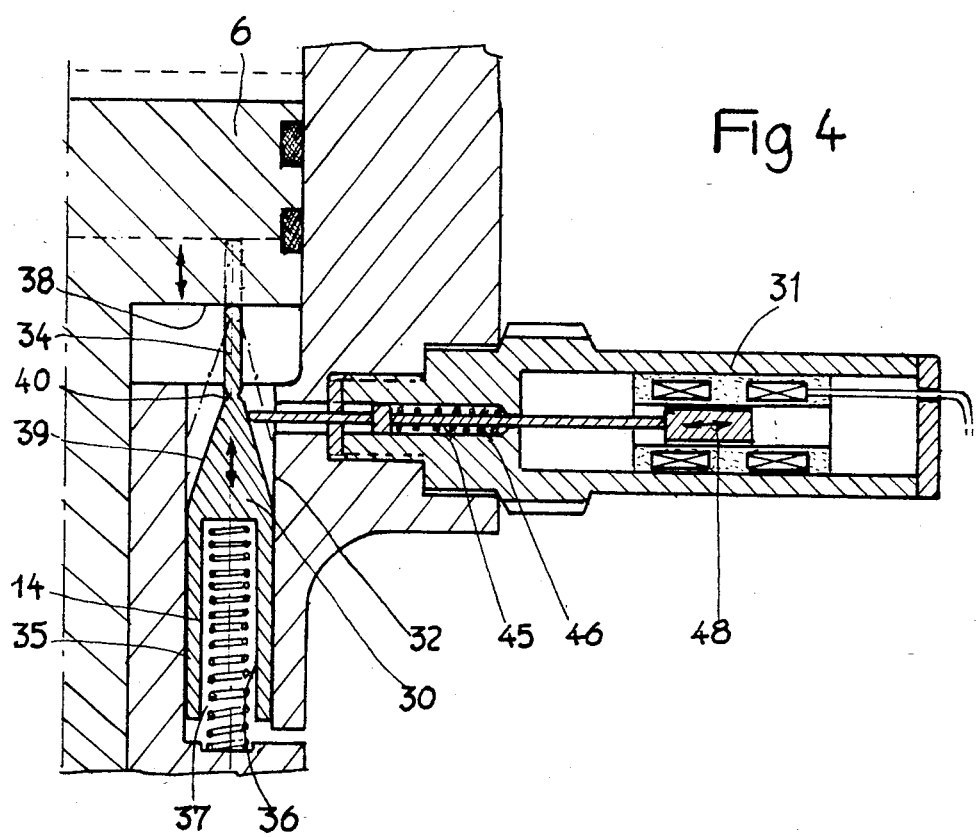
FIG. 4 is a view on a larger scale of part of FIG. 3 where the detection device according to the invention is disposed.

Referring to FIG. 4, it can be seen that the finger 30 is mounted for translatory movement in the axial direction, i.e., the direction of displacement of the movable part of the valve, inside an opening 32 provided in the valve body 8.

This movable finger has a tapered front portion 34 and a rear portion 35 effecting the guiding of the finger 30 in the valve body and having an opening 36 inside which is disposed a spring 37 bearing against the valve body 8 in order to maintain the part 34 of the movable finger in contact with the front face 38 of the piston 6. This face 38 is the face of the piston remote from the face 7 which comes into contact with the valve operating fluid when it is returned to its closed position.

The rear portion and the front portion of the movable finger are connected by an intermediate portion 39 having a frusto-conical outer surface.

The front part 34 of the movable finger is provided with a predetermined breaking point 40 ahead of the frustoconical surface 39.

It will be understood that, when the movable part of the valve moves in the axial direction, the finger 30 will accompany this movable part, to which it is connected kinematically and against which it bears directly by its front part 34.

The displacement detection arrangement 31 is of a construction entirely comparable to the detection device 9 shown in FIG. 2, and has a rod 45 held against the frusto-conical surface 39 of the movable finger by a spring 46.

Like the rod 15, the rod 45 is mounted for translatory movement in a direction at right angles to the axial direction of displacement of the valve, inside the valve body.

The displacement monitoring device 31 likewise comprises a displacement transducer 48 of the differential transformer type, for monitoring the displacements of the rod 45 which accompany the displacements of the movable finger 30, i.e., of the movable part of the valve.

In the embodiment of the device shown in FIGS. 3 and 4, the movable member of the detection device, accompanying the displacements of the movable part of the valve, is composed of the assembly comprising the movable finger 35 and the rod 45 moving inside the valve body and kinematically connected to the movable part of the valve.

The displacements and the positions of the movable part of the valve can be monitored by the device 48, as in the embodiment shown in FIG. 2.

The predetermined breaking point 40 makes it possible to interrupt the kinematic connection between the movable part of the valve and the movable detection member in the event of the jamming of the latter.

In this way, the valve can operate even if the detection device suffers damage entailing its mechanical jamming.

It can be seen that the principal advantages of the invention are that it permits the use of an extremely simple and extremely reliable detection device connected directly to the movable member of the valve, thereby eliminating all risk that the movements of the valve will be hindered by the movable member of this detection device.

The invention extends to the use of any contact surface between the detection member and the movable part of the valve, provided that this surface makes it possible to transmit to the detection member displacements representing the displacements of the movable part of the valve.

While, a displacement transducer of the differential transformer type has been described, this transducer may be of a different type, for example of the potentiometer type, of the stress gauge type, of the variable capacitor type, or of the staged contact series type. This transducer may also be in the form of an induction type proximity transducer or of an optical detector.

The predetermined breaking point may be disposed on any part of this movable member, or a plurality of predetermined breaking points may be provided on the different parts of this movable member. For example, in the case of the device shown in FIG. 4, it is possible to have a predetermined breaking point both on the tapered portion 34 of the movable finger and on the displacement monitoring rod 45.

Finally, the device according to the invention is applicable to all safety valves whose correct operation should usefully be verified in an extremely reliable manner.

We claim:

1. Device for detecting the operation of a valve, comprising
   (a) a movable detection member connected to a movable part of said valve solid with a closure member of said valve and in direct contact with said movable part, so that said detection member and said movable part move simultaneously and proportionally; and
   (b) a displacement and position detector for monitoring the displacements and position of said detection member, said detector comprising at least one breakable part having a predetermined breaking point permitting the connection between said detection member and said movable part to be interrupted through the breaking of said breakable part in the event of jamming and blockage of said detection member.

2. Detection device according to claim 1, wherein said movable part has a portion having a frusto-conical outer surface whose axis of revolution is parallel to the direction of displacement of said moving part, said detection member being composed of a rod disposed at right angles to the axis of said frusto-conical surface against which one of its ends is held by a spring bearing against a fixed part of said valve, said rod having a predetermined breaking point and being disposed so as to be free to perform translatory movements in the body of the valve for the purpose of its displacement in dependence on the displacements of said movable part.

3. Detection device according to claim 1, wherein the detection member comprises
   (a) a movable finger mounted so as to be free to make translatory movements in the direction of displacement of said movable part inside said body, said finger having a tapered portion provided with a predetermined braking point and maintained in contact with said movable part at its end by means of a spring bearing against said body and against said movable finger, said finger also having a portion with a frusto-conical outer surface having an axis parallel to the direction of displacement of said movable part; and
(b) a rod disposed a right angles to the axis of said frusto-conical surface against which one end of said rod is held by a spring bearing against said body and disposed for free translation in said body for the purpose of its displacement in dependence on the displacements of said movable finger and of said movable part, this displacement of said rod being monitored by said displacement detector.

* * * * *